United States Patent
Hashimoto

(10) Patent No.: US 11,297,275 B2
(45) Date of Patent: Apr. 5, 2022

(54) ELECTRONIC DEVICE

(71) Applicant: InnoLux Corporation, Miao-Li County (TW)

(72) Inventor: Kazuyuki Hashimoto, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 154 days.

(21) Appl. No.: 16/792,160

(22) Filed: Feb. 14, 2020

(65) Prior Publication Data

US 2021/0258527 A1 Aug. 19, 2021

(51) Int. Cl.
| H04N 5/376 | (2011.01) |
| H04N 5/378 | (2011.01) |
| G06K 9/00 | (2006.01) |

(52) U.S. Cl.
CPC ......... *H04N 5/3765* (2013.01); *G06K 9/0002* (2013.01); *G06K 9/00013* (2013.01); *H04N 5/378* (2013.01)

(58) Field of Classification Search
CPC ...... H04N 5/3765; H04N 5/378; H04N 5/343; H04N 5/3698; G06K 9/0002; G06K 9/00013; G06K 9/0004; G06K 9/2009
See application file for complete search history.

(56) References Cited

U.S. PATENT DOCUMENTS

| 7,486,809 B2 | 2/2009 | Hara et al. | |
| 2010/0201856 A1* | 8/2010 | Hayashi | H04N 5/361 348/296 |
| 2019/0052820 A1* | 2/2019 | Berner | H04N 5/345 |
| 2020/0042759 A1* | 2/2020 | Kim | G06F 21/32 |
| 2020/0210065 A1* | 7/2020 | Chen | G06F 3/041661 |
| 2020/0242325 A1* | 7/2020 | Hashimoto | G06K 9/2054 |
| 2021/0281789 A1* | 9/2021 | McMahon | H04N 5/378 |

FOREIGN PATENT DOCUMENTS

CN 1657864 A 8/2005

OTHER PUBLICATIONS

SR_Latch_wiki (Year: 2019).*

* cited by examiner

*Primary Examiner* — Shahbaz Nazrul
(74) *Attorney, Agent, or Firm* — Winston Hsu

(57) ABSTRACT

A sensing device may include a signal source, an active area and a plurality of driving units. The active area having a plurality of sensing units. The plurality of driving units sequentially disposed adjacent to the active area and coupled to the plurality of sensing units and the signal source. The signal source provides a first operating mode and a second operating mode. In the first operating mode, a scan signal exported from one of the plurality of driving units has a first voltage level and a second voltage level. In the second operating mode, the scan signal has the second voltage level.

18 Claims, 15 Drawing Sheets

ELECTRONIC DEVICE

BACKGROUND OF THE DISCLOSURE

1. Field of the Disclosure

The disclosure is related to an electronic device, and more particularly, a sensing device capable of speeding up a scan operation.

2. Description of the Prior Art

With the development of electronic products, devices with scanning functions are increasingly used. For example, panels that can scan fingerprints are widely used in various products. In practice, it has been found that the operation speed is still not high enough for users. Therefore, a solution is still in need in the field to increase the pace of a scan operation.

SUMMARY OF THE DISCLOSURE

An embodiment provides a sensing device including a signal source, an active area and a plurality of driving units. The active area may have a plurality of sensing units. The plurality of driving units may be sequentially disposed adjacent to the active area and coupled to the active area and the signal source. The signal source provides a first operating mode and a second operating mode. In the first operating mode, a scan signal exported from one of the plurality of driving units includes a first voltage level and a second voltage level. In the second operating mode, the scan signal includes the second voltage level.

These and other objectives of the present disclosure will no doubt become obvious to those of ordinary skill in the art after reading the following detailed description of the embodiment that is illustrated in the various figures and drawings.

DETAILED DESCRIPTION

Figure 1:
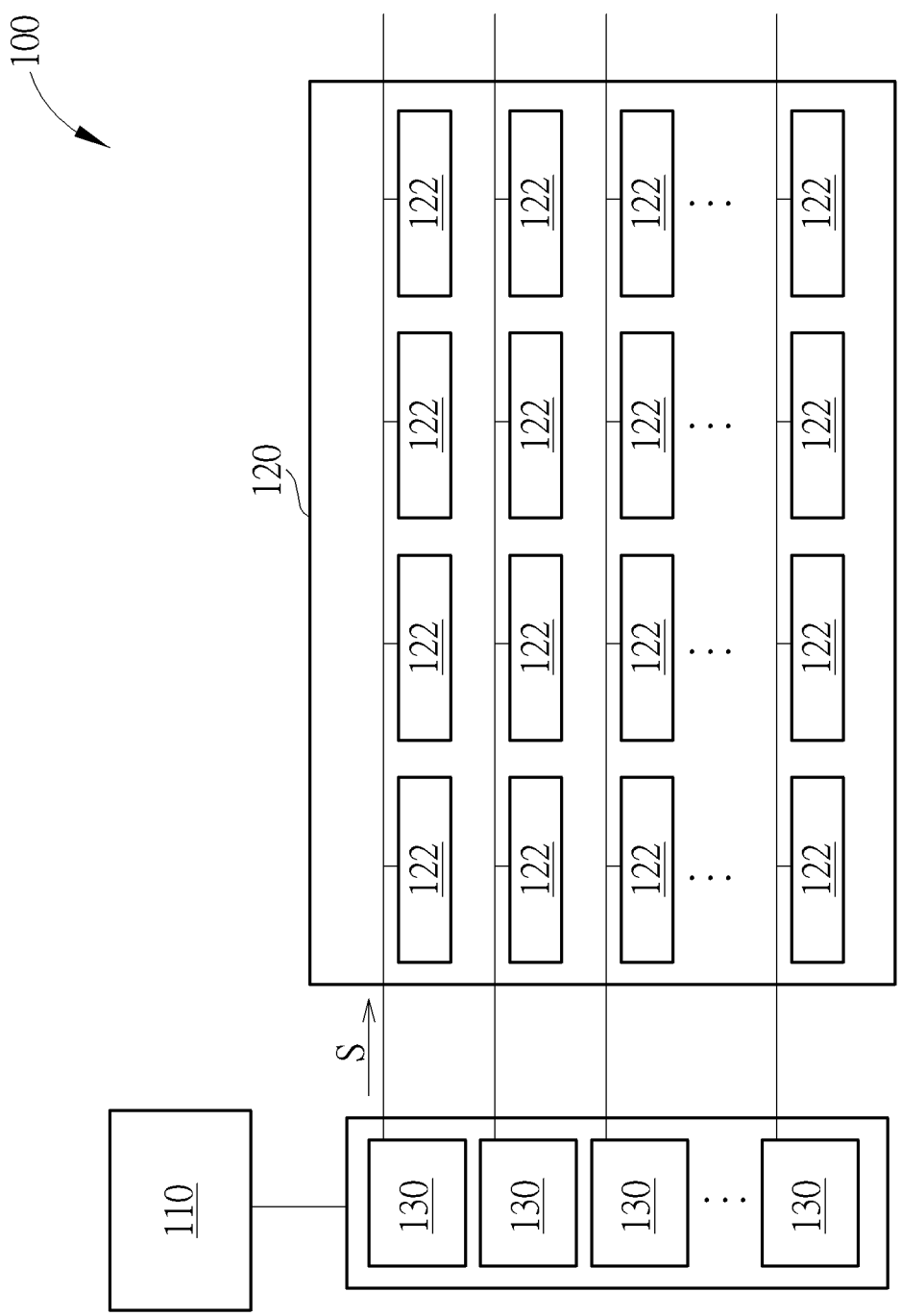
FIG. 1 illustrates a sensing device according to an embodiment.

The present disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly through intervening structures or elements, as well as both movable or rigid attachments or relationships, unless expressly described otherwise.

FIG. 1 illustrates a sensing device 100 according to an embodiment of the disclosure. The sensing device 100 may include a signal source 110, an active area 120 and a plurality of driving units 130. The active area 120 may have a plurality of sensing units 122. The plurality of driving units 130 may be sequentially disposed adjacent to the active area 120 and coupled to the sensing units 122 of the active area 120 and the signal source 110, and a scan signal S exported from one of the plurality of driving units 130 to the sensing units 122 of a row. The signal source 110 may provide a first operating mode and a second operating mode. In the first operating mode, a scan signal S exported from one of the plurality of driving units 130 may include a first voltage level L1 and a second voltage level L2. In the second operating mode, the scan signal S may include a second voltage level L2. The signal at the second voltage level L2 may be used to inactivate a corresponding row of the active area so as not to scan the row.

According to an embodiment, the driving units 130 and the active area 120 may be implemented by including transistors of the same type. For example, the driving units 130 and the active area 120 may include p-type thin-film transistors (TFTs), but the disclosure is not limited thereto. In some embodiments, driving units 130 and the active area 120 may include n-type thin-film transistors (TFTs). Since the driving units 130 and the active area 120 may be implemented by including transistors of the same type, the manufacture process may be simplified, or the related cost may be lower. The sensing device 100 may be operated in a skip scan mode or a jump scan mode to speed up a scan operation as described below.

Here in the text, a scan operation is performed by rows of the active area 120. When a row is to perform scanning, it means the sensing units 122 (as shown in FIG. 1) of the row may be activated to sense an image such as a fingerprint. When a row is not to perform scanning, it means the sensing units 122 of the row may not be activated to sense the image. In the text, when a row is activated, it means the row is activated to perform scanning.

The mentioned first voltage level L1 may be an enabling level, and the second voltage level L2 may be a disabling level. In other words, a transistor of the active area 120 may be turned on when the scan signal S is at the first voltage level L1, and the transistor of the active area 120 may be turned off when the scan signal is at the second voltage level L2. To be more specific, when the driving units 130 and the active area 120 are implemented by including all p-type transistors, the first voltage level L1 is a low voltage level, because the signal at a low voltage level may activate the p-type transistors in the active area 120 and the driving units 130. In contrast, the second voltage level L2 is a high voltage level, because the signal at a high voltage level may not activate the p-type transistors in the active area 120 and the driving units 130. Otherwise, when the driving units 130 and the active area 120 are implemented by including all n-type transistors, the first voltage level L1 is a high voltage level, and the second voltage level L2 is a low voltage level.

Figure 2:
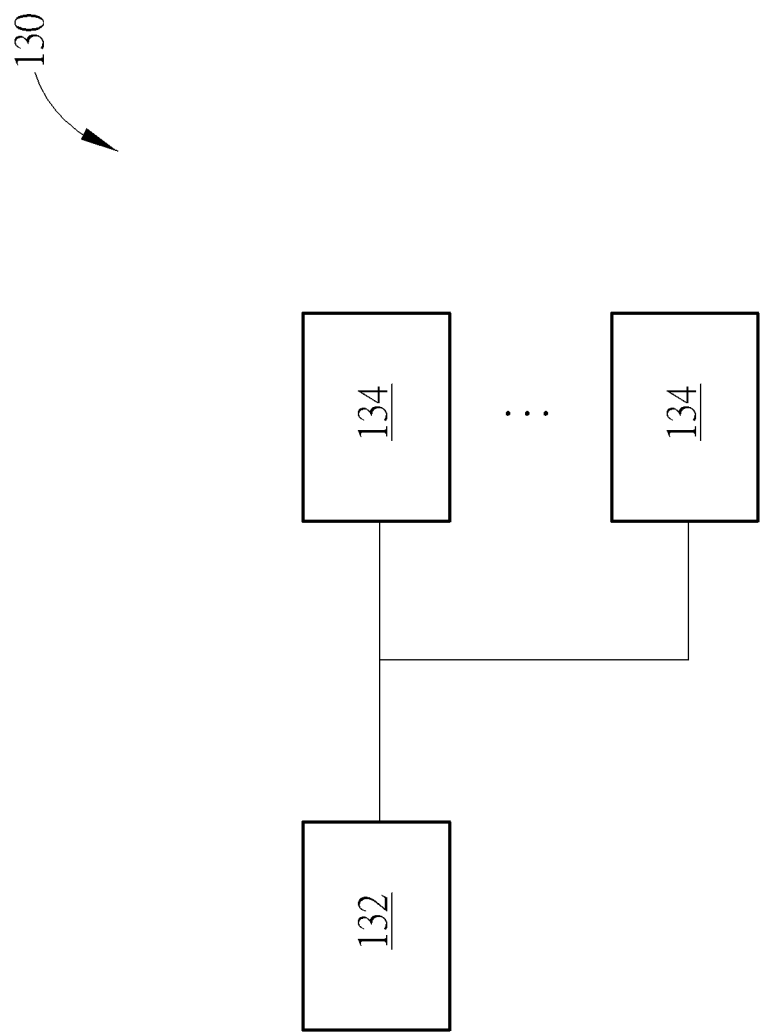
FIG. 2 illustrates a block diagram of a driving unit according to an embodiment.

FIG. 2 illustrates a block diagram of a driving unit 130 according to an embodiment. As shown in FIG. 2, each of the driving units 130 of FIG. 1 may include a latch circuit 132 and a plurality of buffer circuits 134. For example, the latch circuit 132 may include (but not limited to) an RS latch with a reset terminal and a set terminal and may be used to store state information. The buffer circuit 134 may be controlled to export a scan signal and a carry signal as described below.

Figure 3:
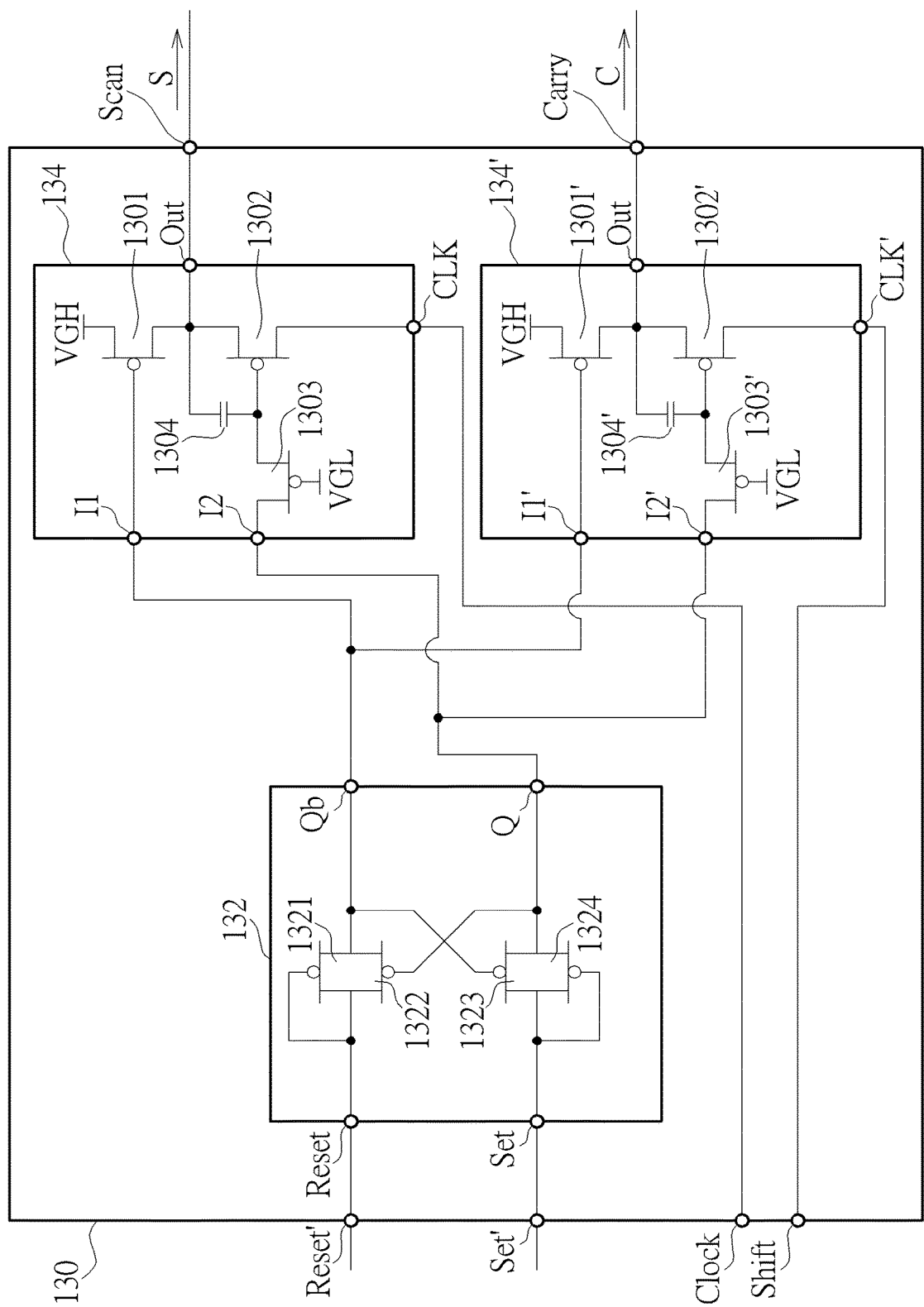
FIG. 3 illustrates the driving unit of FIG. 1 and FIG. 2 according to an embodiment.

FIG. 3 illustrates the driving unit 130 of FIG. 1 and FIG. 2 according to an embodiment. The driving unit 130 of FIG. 3 may be capable of being operated in the skip scan mode so as not to activate a specific row of the active area 120 of FIG. 1 to perform scanning, and the scan operation of the sensing device can be accelerated.

As shown in FIG. 3, the latch circuit 132 may include a reset terminal Reset, a set terminal Set, and an output terminal Q and another output terminal Qb. Signals exported from the terminals Q and Qb may be complementary to each other. for example, when one is at a high voltage level, another one may be at a low voltage level. The latch circuit 132 may include transistors 1321, 1322, 1323 and 1324 coupled as shown in FIG. 3 to be coupled to the terminals Reset, Set, Q or Qb respectively.

As shown in FIG. 3, the first buffer circuit 134 may include input terminals I1 and I2, an output terminal Out and a clock terminal CLK. The first buffer circuit 134 may include transistors 1301, 1302 and 1303 and a capacitor 1304 coupled as shown in FIG. 3 to be coupled to the terminals I1,I2, Out and CLK. As shown in FIG. 3, a terminal of the transistor 1301 may be coupled to a high voltage terminal VGH, and a terminal of the transistor 1303 may be coupled to a low voltage terminal VGL. The capacitor 1304 may be used to keep a voltage level and to enhance a bootstrap effect. Similarly, the second buffer circuit 134' may include input terminals I1' and I2', an output terminal Out' and a clock terminal CLK'. The second buffer circuit 134' may include transistors 1301', 1302' and 1303' and a capacitor 1304'. Since the second buffer circuit 134' is similar to the first buffer circuit 134, the couplings of the components in the second buffer circuit 134' are not repeatedly described herein.

As shown in FIG. 3, in the driving unit 130 capable of running the skip scan mode, a first buffer circuit 134 may export a scan signal S, and a second buffer circuit 134' may export a carry signal C. Hence, as show in FIG. 3, the driving unit 130 may have a terminal Reset' coupled to the reset terminal Reset of the latch circuit 132, a terminal Set' coupled to the set terminal Set of the latch circuit 132, a terminal Scan coupled to the output terminal Out of the buffer circuit 134, and a terminal Carry coupled to the output terminal Out' of the buffer circuit 134'. The driving unit 130 may also have a clock terminal Clock and a shift terminal Shift respectively coupled to the terminal CLK of the first buffer circuit 134 and the terminal CLK' of the second buffer circuit 134'.

The scan signal S may control a row of the active area 120 so as to scan or not to scan the image. The carry signal C may be transmitted to another driving unit 130 as described in FIG. 4. The couplings of the transistors and capacitor shown in FIG. 3 are merely as an example instead of limiting the scope of embodiments. The driving unit 130 of FIG. 3 may be regarded as a 1-set 2-out driving unit since it has one set terminal Set' and two output terminals Scan and Carry.

Figure 4:
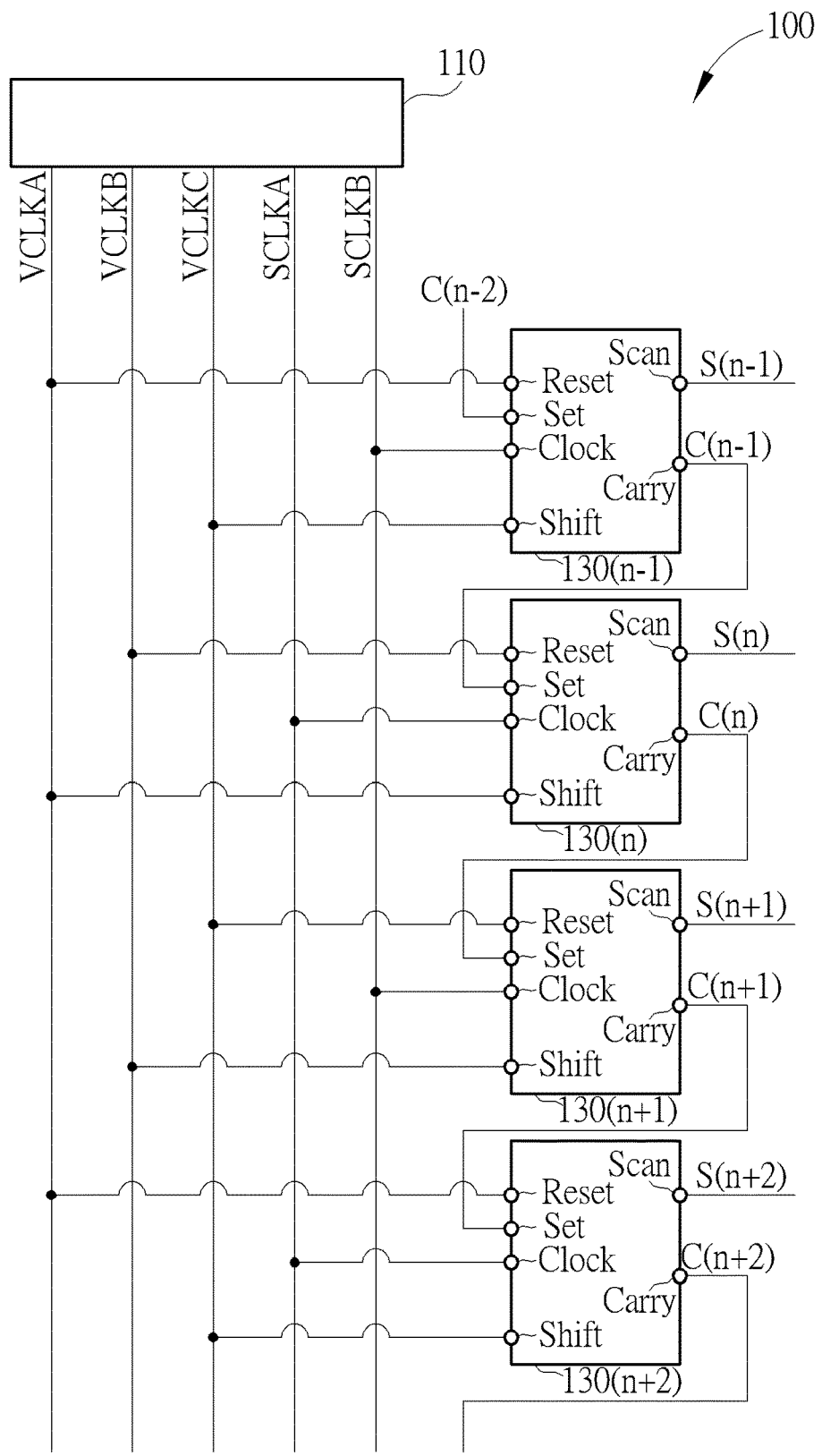
FIG. 4 illustrates a part of the sensing device according to an embodiment.

FIG. 4 illustrates a part of the sensing device 100 according to an embodiment. The structure of FIG. 4 may be capable of being operated in a skip scan mode. In FIG. 4, the signal source 110 may provide clock signals VCLKA, VCLKB, VCLKC, SCLKA and SCLKB to the driving units 130($n$–1), 130($n$), 130($n$+1) and 130($n$+2). Each driving unit shown in FIG. 4 may be like the driving unit 130 shown in FIG. 3. As shown in FIG. 4, terminals Scan and Carry of the driving unit 130($n$–1) may respectively export a scan signal S(n–1) and a carry signal C(n–1), terminals Scan and Carry of the driving unit 130$n$ may respectively export a scan signal S(n) and a carry signal C(n), and so on. In FIG. 4, the scan signal S(n) may control a corresponding row (for example, but not limited to, an nth row) of the active area 120 so as to scan or not to scan the image.

Figure 5:
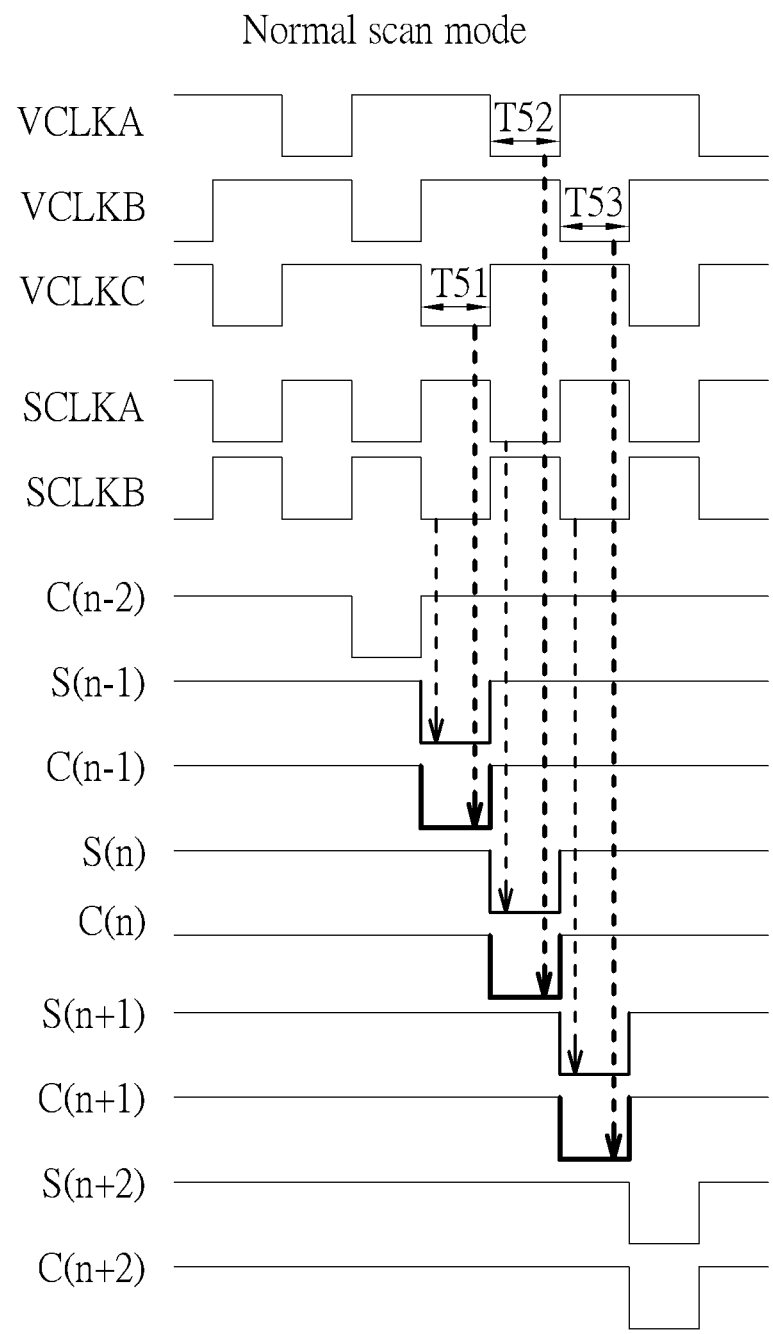
FIG. 5 illustrates a waveform when the sensing device of FIG. 4 is operated in a normal scan mode.
Figure 6:
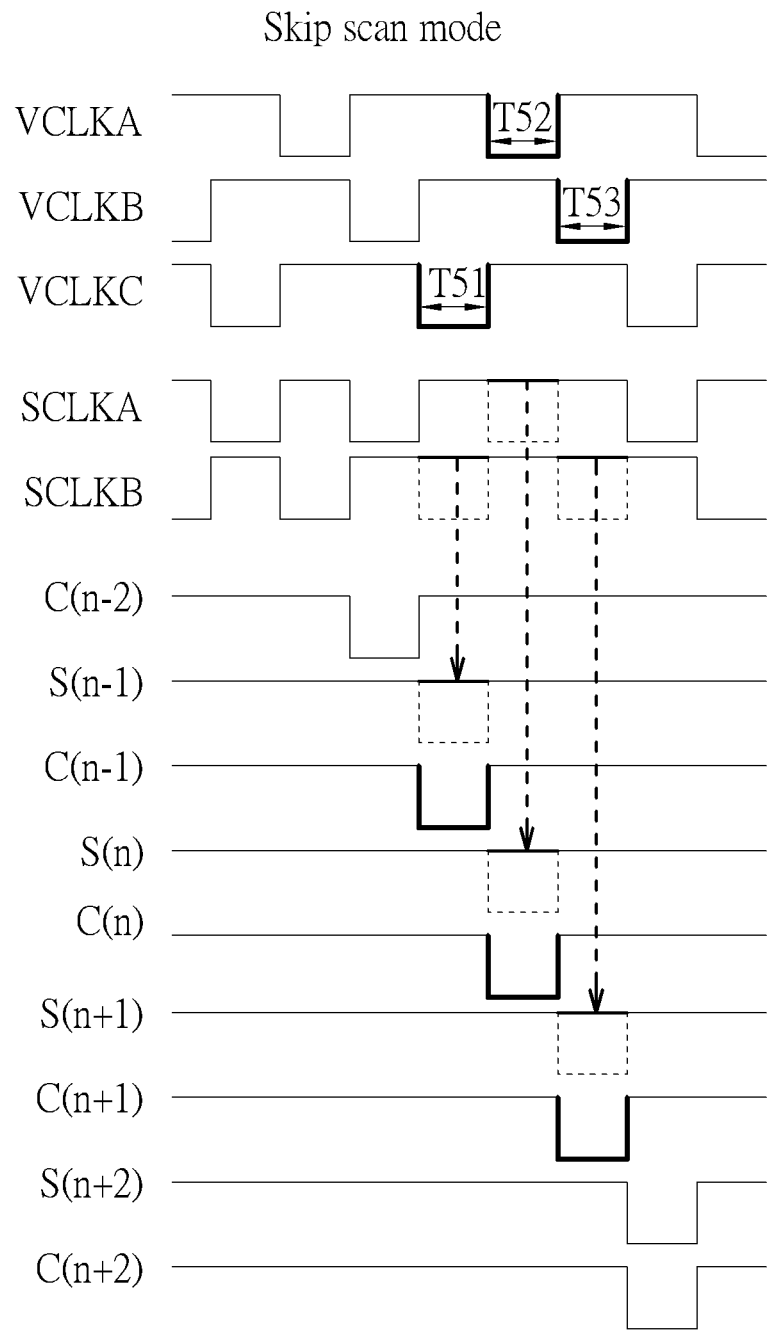
FIG. 6 illustrates a waveform when the sensing device of FIG. 4 is operated in a skip scan mode.

FIG. 5 illustrates a waveform when the sensing device 100 of FIG. 4 is operated in a normal scan mode. FIG. 6 illustrates a waveform when the sensing device 100 of FIG. 4 is operated in a skip scan mode.

Figure 10:
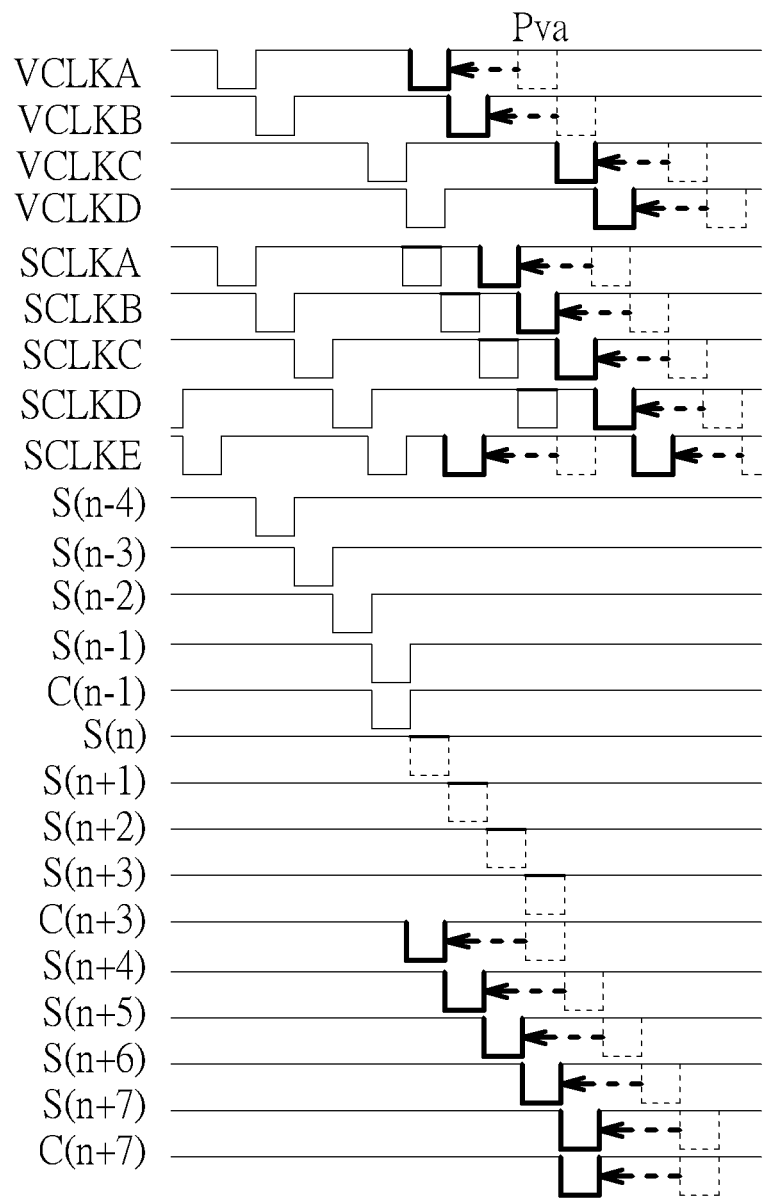
FIG. 10 illustrates a waveform when the sensing device of FIG. 8 is operated in a skip scan mode.

Regarding dotted arrows drawn in the waveforms, in FIG. 5 and FIG. 6, each dotted arrow may indicate the relationship of two signals. For example, as shown in FIG. 5, a dotted arrow between the clock signal SLCKB and the scan signal S(n−1) may indicate that a pulse of the clock signal SLCKB causes a pulse of the scan signal S(n−1). Likewise, in, FIG. 13 described below, a dotted arrow between the waveforms of two signals may indicate the relationship of the two signals. In FIG. 10, a dotted arrow on a waveform of a signal may indicate the shift of a pulse so as to described the pulse may be triggered earlier. More details are described as follows.

According to an embodiment, the normal scan mode may be the abovementioned first operating mode, and the skip scan mode may be the abovementioned second operating mode. In the first operating mode, the first scan signal (e.g., S(n) of FIG. 4) exported from a first driving unit (e.g., 130(n) of FIG. 4) may include a first voltage level and a second voltage level. To be more specific, when the first scan signal S(n) is at the first voltage level (e.g., a low voltage level), the row corresponding to the signal S(n) may be activated to scan an image, and when the next row corresponding to the second scan signal S(n+1) is activated, the first scan signal S(n) may be at the second voltage level (e.g., a high voltage level) and the row corresponding to the scan signal S(n) may be inactivated. The carry signal (e.g., C(n) of FIG. 4) may include the first voltage level to activate a second driving unit (e.g., 130(n+1) of FIG. 4). In the second operating mode, the first scan signal S(n) may be at the second voltage level so as not to scan the image, and the carry signal C(n) may include the first voltage level to activate the second driving unit. It should be noted that in this embodiment, the carry signal may be exported from one driving unit (e.g., 130(n)) to the next driving unit (e.g., 130(n+1)), and the term "activate a driving unit" means a signal is transmitted to at least one transistor in a driving unit, and the transistor is activated when the signal is at a first voltage level.

Regarding FIG. 4, each of the carry signals (e.g., C(n−1), C(n), C(n+1) and C(n+2)) may be controlled by the corresponding one of the clock signals VCLKA to VCLKC. Each of the scan signals (e.g., S(n−1), S(n), S(n+1) and S(n+2)) may be controlled by the corresponding one of the clock signals SCLKA to SCLKB. Since the structure of FIG. 3 is formed by using p-type transistors, the low voltage level of the clock signals may be an enabling level. It should be noted that when the structure of FIG. 3 is formed by using n-type transistors, the high voltage level of the clock signals may be an enabling level.

Regarding FIG. 4 and FIG. 5, in an time interval T51, the low voltage level of the clock signal VCLKC may cause the carry signal C(n−1) to be at a low voltage level, and the low voltage level of the clock signal SCLKB may cause the scan signal S(n−1) to be at a low voltage level. Hence, the scan signal S(n−1) may control a row of the active area 120 to scan the image, and the carry signal C(n−1) may activate a subsequent driving unit 130(n).

Likewise, in a time interval T52 subsequent to the time interval T51, the scan signal S(n) may be at an enabling level so as to activate a subsequent row to perform scanning; in a time interval T53 subsequent to the time interval T52, the scan signal S(n+1) may be at an enabling level so as to activate a further subsequent row to perform scanning, and so on. In other words, in the normal scan mode corresponding to FIG. 5, the sensing device 100 may activate the active area 120 row by row.

Regarding FIG. 4 and FIG. 6, in the skip scan mode, in the time intervals T51 to T53, the clock signals SCLKA and SCLKB may be adjusted to be at the high voltage level (e.g., a disabling level). Hence, as shown in FIG. 6, in the time interval T51, T52 and T53, the scan signals S(n−1), S(n) and S(n+1) may be at the high voltage level (e.g., a disabling level) so as not to activate the corresponding rows of the active area 120. Hence, the rows not activated may be regarded as being "skipped".

Figure 7:
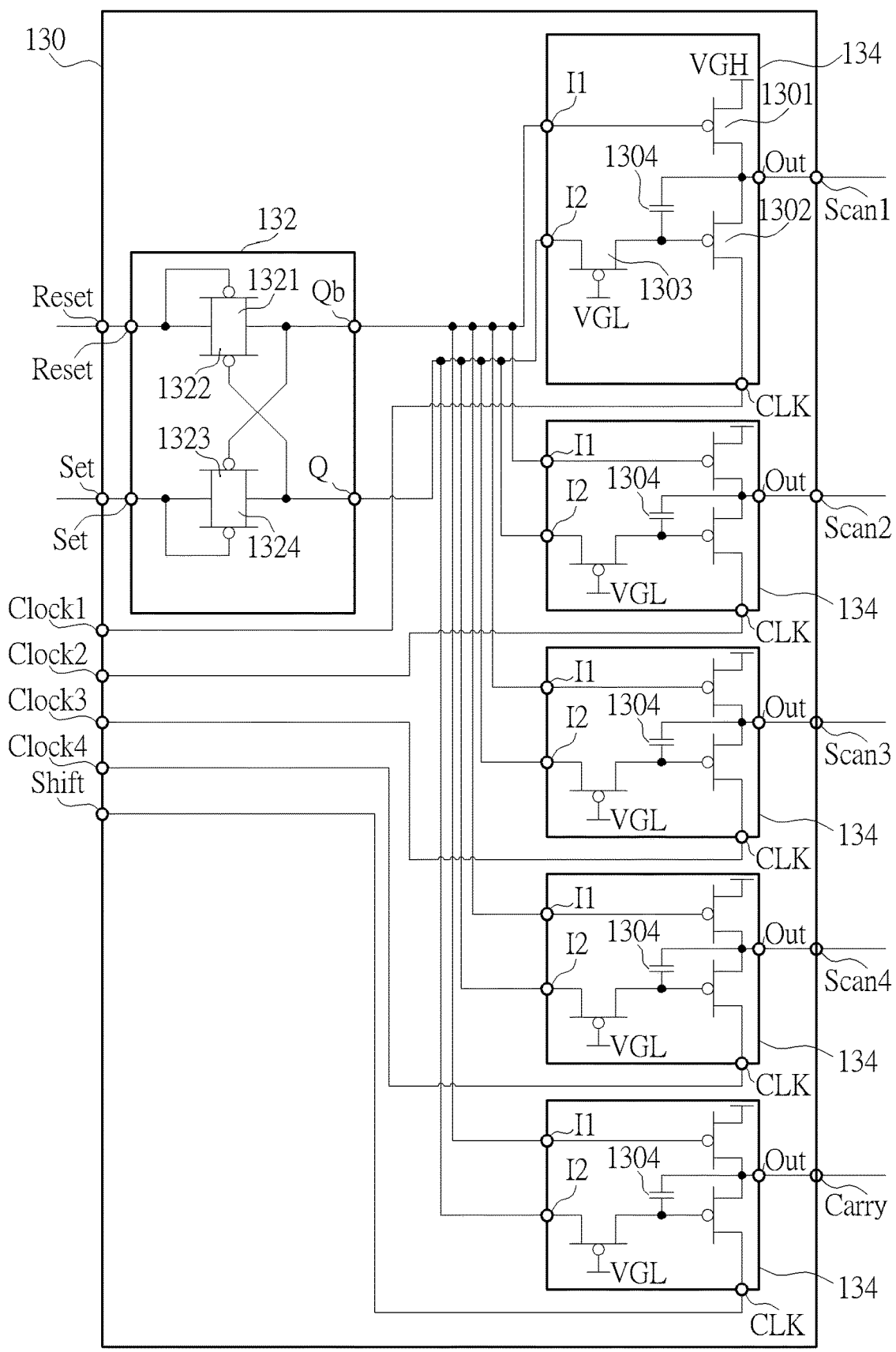
FIG. 7 illustrates a driving unit according to another embodiment.
Figure 8:
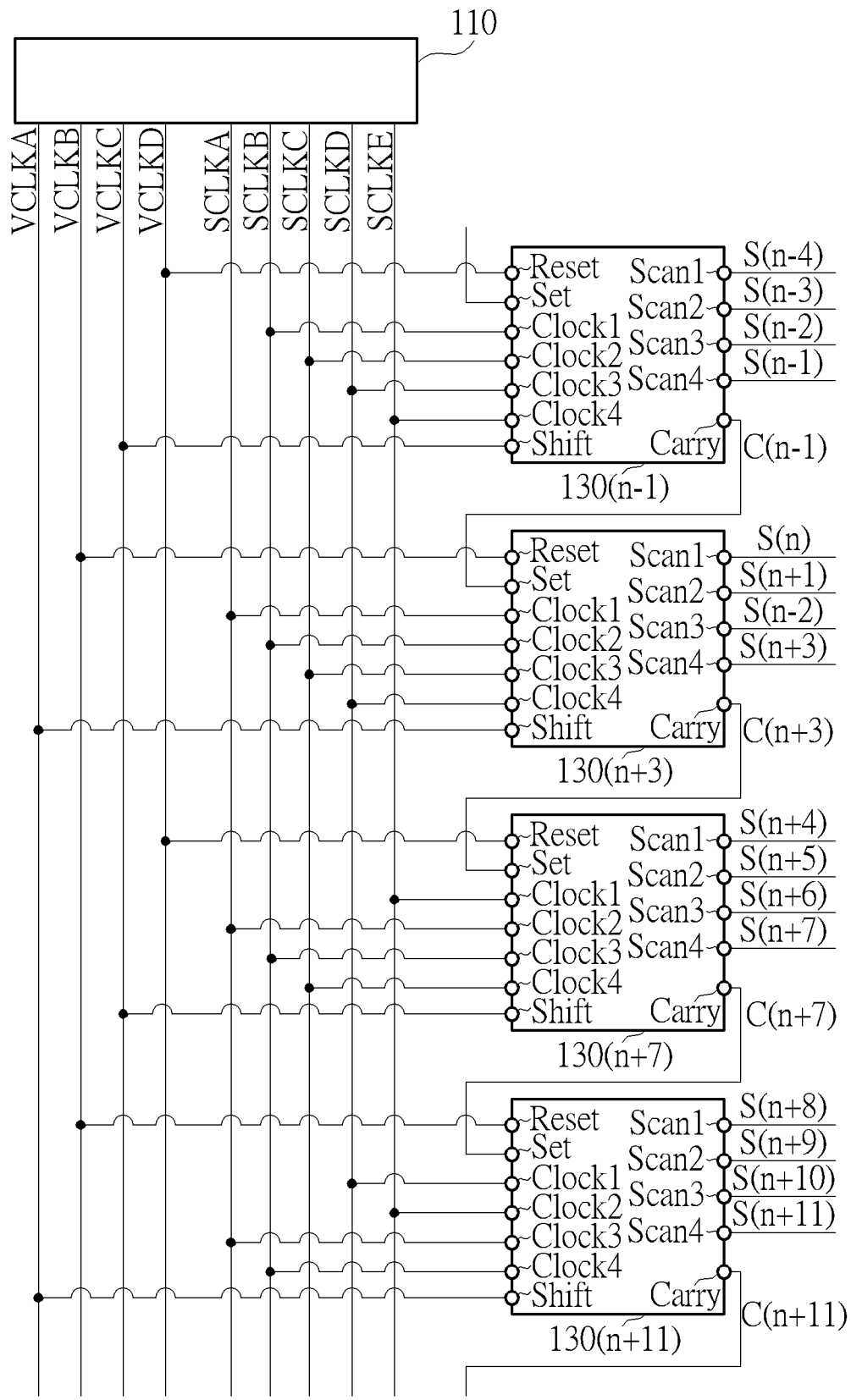
FIG. 8 illustrates a part of the sensing device according to an embodiment.
Figure 9:
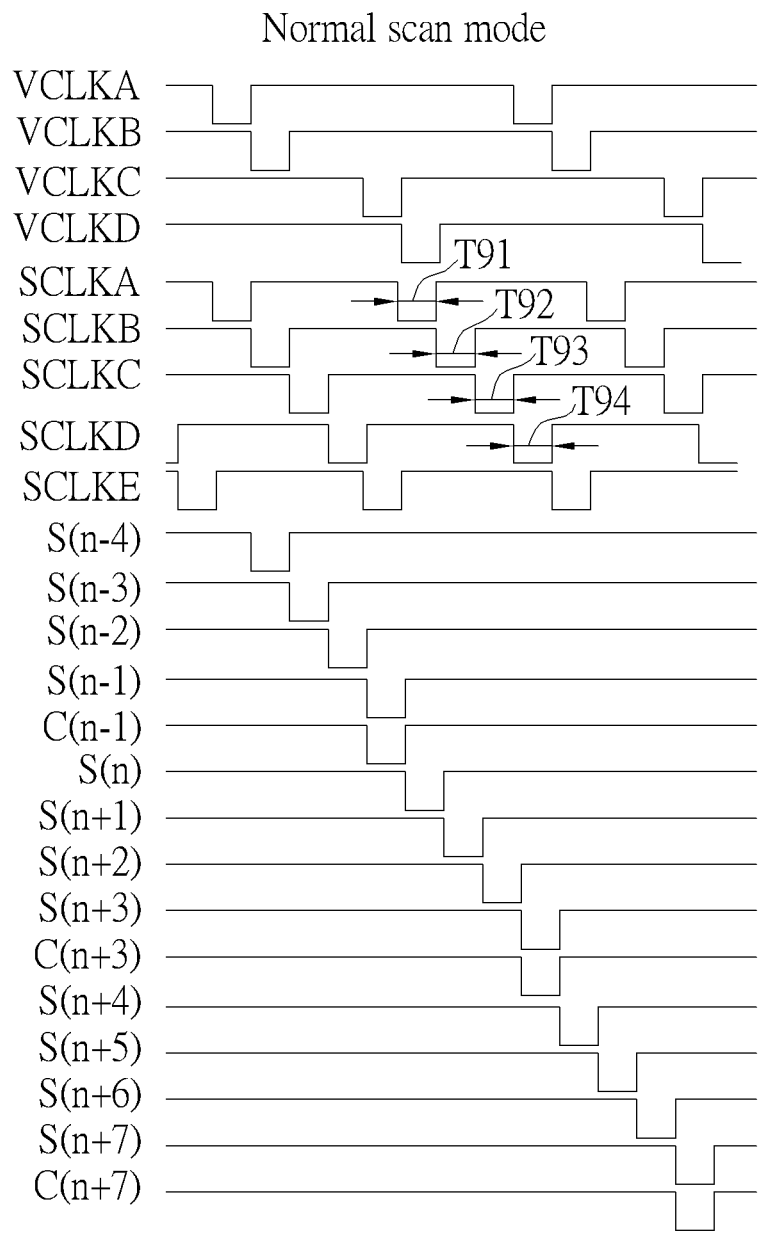
FIG. 9 illustrates a waveform when the sensing device of FIG. 8 is operated in a normal scan mode.

FIG. 4 to FIG. 6 may be introduced to describe the related principles, and FIG. 7 to FIG. 9 will provide an example of accelerating the scan operation.

FIG. 7 illustrates a driving unit 130 according to another embodiment. FIG. 8 illustrates a part of the sensing device 100 according to an embodiment. Each driving unit in FIG. 8 may be like the driving unit 130 shown in FIG. 7. FIG. 9 illustrates a waveform when the sensing device 100 of FIG. 8 is operated in a normal scan mode. FIG. 10 illustrates a waveform when the sensing device 100 of FIG. 8 is operated in a skip scan mode.

As shown in FIG. 7 to FIG. 10, the driving unit 130 may further include a third buffer circuit used to export a second scan signal. In the second operating mode such as a skip scan mode, the second scan signal (e.g., S(n+1) in a time interval T92 of FIG. 10) may be at the second voltage level (e.g., a high voltage level) so as not to scan an image, and the carry signal (e.g., C(n+3) in a time interval T91 of FIG. 10) may be at the first voltage level to activate another driving unit. An example is described as follows.

For example, regarding FIG. 7, the driving unit 130 of FIG. 7 may be similar to the driving unit 130 of FIG. 3; however, the driving unit 130 of FIG. 7 may include five buffer circuits 134, but the disclosure is not limited thereto.

The clock terminals CLK of the five buffer circuits 134 in FIG. 7 may be respectively coupled to clock terminals Clock1, Clock2, Clock3, Clock4 and a shift terminal Shift. For instance, in FIG. 8 to FIG. 10, the clock signals SCLKA, SCLKB, SCLKC and SCLKD may be used to respectively control the scan signals S(n), S(n+1), S(n+2) and S(n+3) of the driving unit 130(n+3).

Regarding FIG. 8 and FIG. 9, in time intervals T91, T92, T93 and T94, the clock signals SCLKA, SCLKB, SCLKC and SCLKD may be sequentially at a low voltage level to respectively control the scan signals S(n), S(n+1), S(n+2) and S(n+3) to be at a low voltage level, and the rows corresponding to the scan signals S(n), S(n+1), S(n+2) and S(n+3) may be sequentially activated. Hence, according to FIG. 9, the sensing device 100 may be operated in a normal scan mode.

In FIG. 10, in the time internals T91, T92, T93 and T94, the clock signals SCLKA, SCLKB, SCLKC and SCLKD may be adjusted to be kept at a high voltage level (e.g., a disabling level) instead of the low voltage level, and therefore the scan signals S(n), S(n+1), S(n+2) and S(n+3) may be kept at a high voltage level so as not to activate corresponding rows of the active area 120. Hence, during the time intervals T91 to T94, the rows may be "skipped" without being scanned. As a result, as shown in FIG. 10, a plurality of signal pulses of the clock signals VCLKA, VCLKB, VCLKC, VCLKD and SCLKA to SCLKE may be allowed to be triggered earlier. For example, a pulse Pva of the clock signal VCLKA may be shifted on the time line from the time interval T94 to the time interval T91 as shown in FIG. 10. Hence, as shown in FIG. 10, the scan signals S(n+4), S(n+5), S(n+6) and S(n+7) may be turned to the low voltage level earlier so as to activate related rows of the active area 120, and the whole scan operation may be accelerated.

In FIG. 8 to FIG. 10, the clock signals are adjusted to change the waveforms of the scan signals S(n) to S(n+3) so as not to activate the rows corresponding to the scan signals S(n) to S(n+3). However, this is merely an example. Although the scan signals S(n) to S(n+3) are exported from the same driving unit 130(*n*+3), the scan signals S(n) to S(n+3) may be separately controlled by separately adjusting the clock signals SCLKA to SCLKD. Hence, for example, a row corresponding to the scan signal S(n) may be skipped without being activated and another row corresponding to the scan signal S(n+1) may be normally activated according to requirements.

Because the driving unit 130 of FIG. 7 has one set terminal Set and five output terminals Scan1 to Scan4 and the carry terminal Carry, the driving unit 130 of FIG. 7 may be regarded as a 1-set 5-out driving unit capable of skipping up to four rows. Likewise, a 1-set n-out driving unit may be implemented by modifying the driving units 130 of FIG. 3 and FIG. 7 where n is an integer larger than 1.

In FIG. 3 to FIG. 10, it has been described to speed up the scan operation by operating the sensing device 100 in a skip scan mode by means of 1-set n-out driving units. Another embodiment of speeding up the scan operation by operating the sensing device 100 in a jump scan mode is described as follows.

Figure 11:
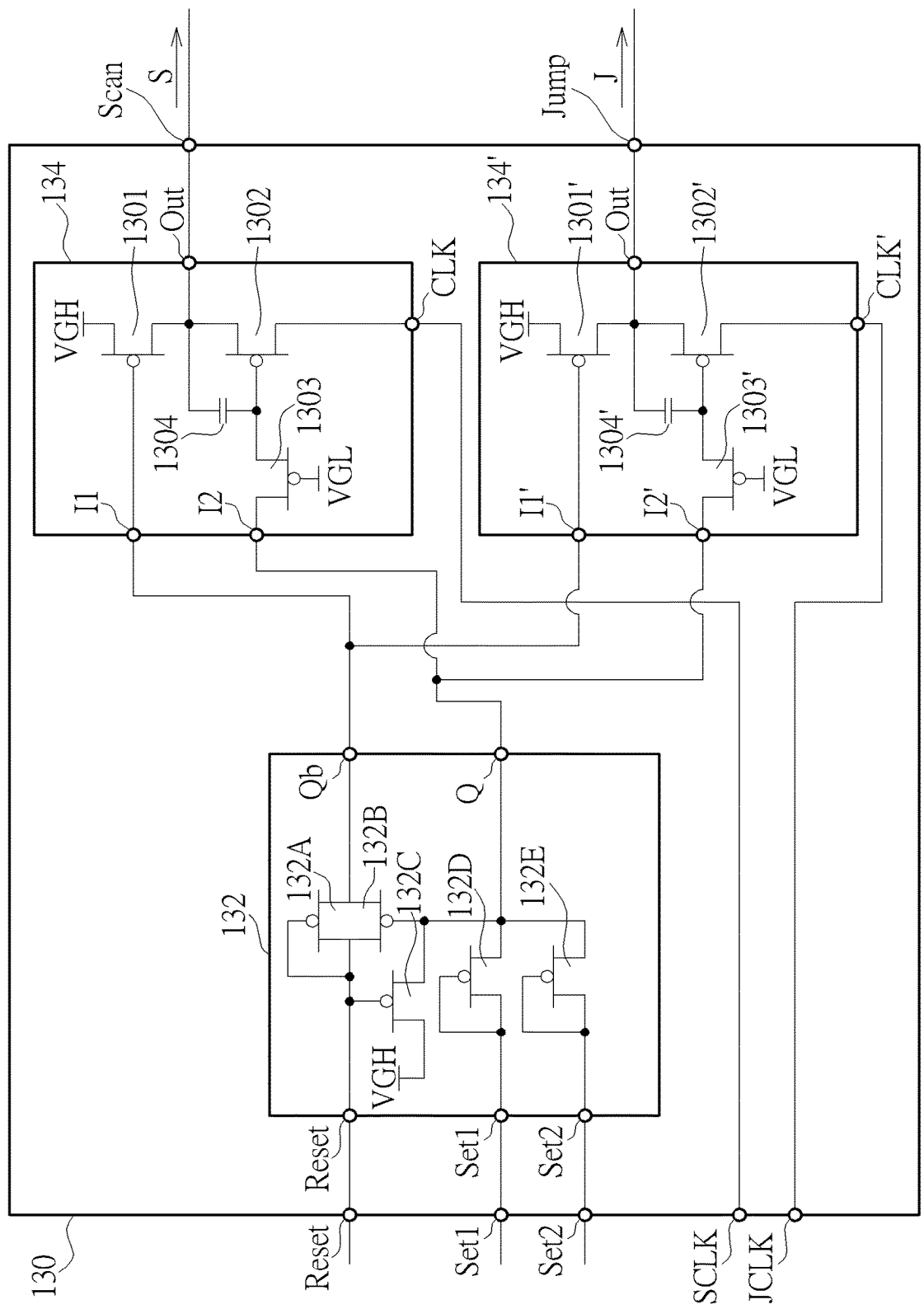
FIG. 11 illustrates a driving unit according to another embodiment.
Figure 12:
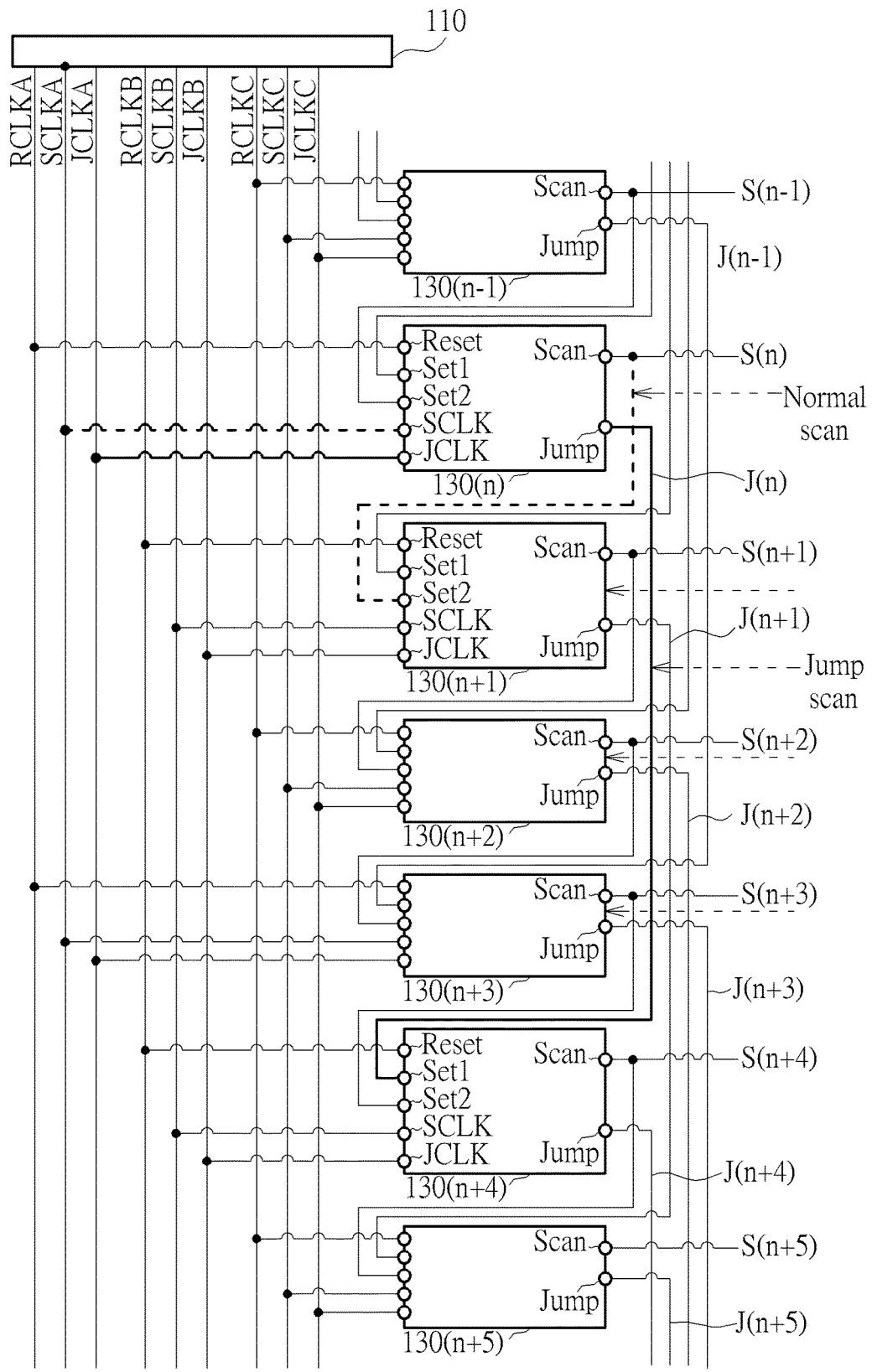
FIG. 12 illustrates a part of the sensing device according to an embodiment.
Figure 13:
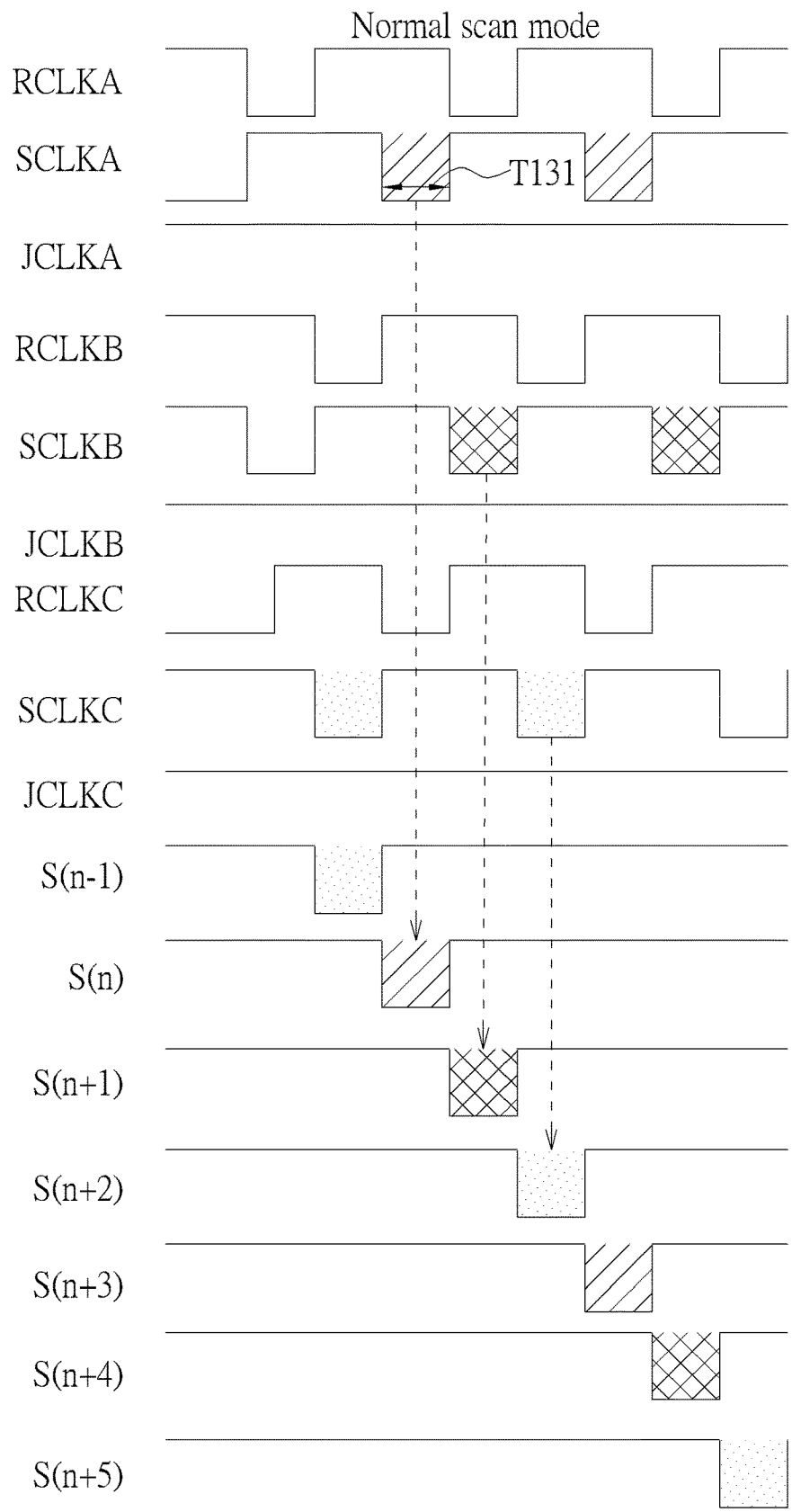
FIG. 13 illustrates a waveform when the sensing device of FIG. 12 is operated in a normal scan mode.
Figure 14:
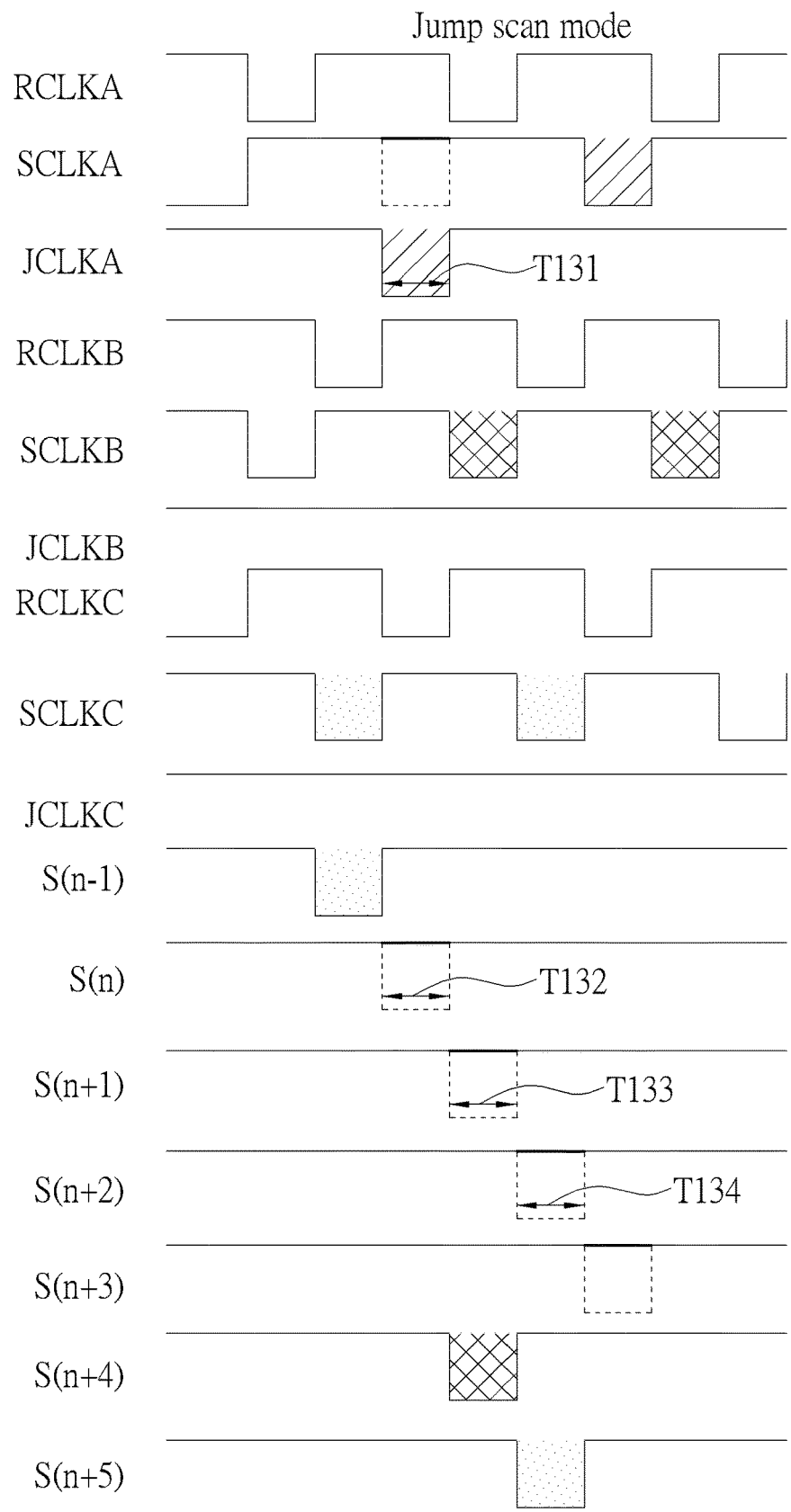
FIG. 14 illustrates a waveform when the sensing device of FIG. 12 is operated in a jump scan mode.

FIG. 11 illustrates a driving unit 130 according to another embodiment. FIG. 12 illustrates a part of the sensing device according to an embodiment. FIG. 13 illustrates a waveform when the sensing device 100 of FIG. 12 is operated in a normal scan mode. FIG. 14 illustrates a waveform when the sensing device 100 of FIG. 12 is operated in a jump scan mode.

The driving unit 130 of FIG. 11 may include a latch circuit 132 and two buffer circuits 134 and 134' coupled to the latch circuit 132.

The buffer circuits 134 and 134' of FIG. 11 may be similar to the buffer circuits 134 and 134' of FIG. 3, so it is not repeatedly described. However, the second buffer circuit 134' shown in FIG. 11 may be coupled to a jump terminal Jump of the driving unit 130 of FIG. 11 for exporting a jump signal J. Moreover, a clock terminal CLK of the second buffer circuit 134 of FIG. 11 may be coupled to a clock terminal JCLK of the driving unit 130 of FIG. 11. In FIG. 11, the scan signal S may be controlled according to a clock signal received by the clock terminal SCLK of the driving unit 130. The jump signal J may be controlled according to a clock signal received by the clock terminal JCLK of the driving unit 130.

The latch circuit 132 of FIG. 11 may have a different structure from the structure of the latch circuit 132 of FIG. 3, but the disclosure is not limited thereto. The latch circuit 132 of FIG. 11 may include a reset terminal Reset, set terminals Set1 and Set2 and output terminals Q and Qb. The latch circuit 132 of FIG. 11 may include transistors 132A, 132B, 132C, 132D and 132E coupled as shown in FIG. 11 to be coupled to the terminals Reset, Set1, Set2, Q and Qb. The couplings of the transistors and capacitor shown in FIG. 11 may be merely as an example instead of limiting the scope of embodiments.

The driving unit 130 of FIG. 11 may have two set terminals Set1 and Set2 and two output terminals Scan and Jump, so driving unit 130 of FIG. 11 may be regarded as a 2-set 2-out driving unit.

FIG. 12 illustrates a part of the sensing device 100 according to another embodiment. The structure of FIG. 12 may be operated in a jump scan mode. In FIG. 12, the signal source 110 may provide clock signals RLCKA, RCLKB, RCLKC, SCLKA, SCLKB, SCLKC, JCLKA, JCLKB and JCLKC to the driving units 130(*n*−1) to 130(*n*+5). Each driving unit shown in FIG. 12 may be like the driving unit 130 of FIG. 11.

Regarding FIG. 11 and FIG. 12, in an ith driving unit (e.g., 130(*n*)), a first buffer circuit may be used to export a scan signal (e.g., S(n)) to control a row of the active area 120 (e.g., a row controlled by the scan signal S(n)), as shown in FIG. 12, the scan signal may be transmitted to the subsequent the (i+1)th driving unit (e.g., 130(*n*+1)), a second buffer circuit may be used to export a jump signal (e.g., J(n)) to a jth driving unit (e.g., 130(*n*+4)), i and j are positive integers, and i+1<j.

According to an embodiment, in a first operating mode (e.g., a normal scan mode), the scan signal (e.g., S(n)) may include a first voltage level (e.g., a low voltage level) and a second voltage level (e.g., a high voltage level). To be more specific, in the first operating mode, the scan signal S(n) may be at the first voltage level to activate a corresponding row and be also transmitted to the next driving unit 130(*n*+1), then the scan signal S(n) may be changed to the second voltage level when the next row is activated by the scan signal S(n+1). And the jump signal (e.g., J(n)) may be at the second voltage level (e.g., a high voltage level) so as not to activate the jth driving unit (e.g., 130(*n*+4)). In the second operating mode, the scan signal (e.g., S(n)) may be at the second voltage level so as not to activate the corresponding row, and the jump signal (e.g., J(n)) may include the first voltage level to activate the jth driving unit (e.g., 130(*n*+4)).

For example, regarding FIG. 12 and FIG. 13, in a time interval T131, the clock signal SCLKA may be changed to a low voltage level (e.g., an enabling level). Hence, the scan signal S(n) exported from the driving unit 130*n* may be changed to a low voltage level in the time interval T131 accordingly so as to activate a corresponding row of the active area 120 and activate a subsequent driving unit 130(*n*+1), then the driving unit 130(*n*+1) exports a scan signal S(n+1) at the low voltage level to activate a subsequent row corresponding to the driving unit 130(*n*+1). Then, the driving units 130(*n*+2) to 130(*n*+5) may be activated sequentially to change scan signals S(n+2) to S(n+5) to the low voltage level sequentially. The related rows may be activated row by row.

Regarding FIG. 12 and FIG. 14, unlike FIG. 13, in the time interval T131, the clock signal SCLKA may be kept at a high voltage level (e.g., a disabling level) and the clock signal JCLKA may be changed to a low voltage level as shown in FIG. 14. Hence, the scan signal S(n) may not be changed to the low voltage level (e.g., an enabling level), and the corresponding row may be not activated. In addition, the scan signals S(n+1) to S(n+3) exported from the subsequent driving units 130(*n*+1) to 130(*n*+3) may not include the low voltage level, and the corresponding rows may not be activated. However, the jump signal J(n) may be changed to the low voltage level in the time interval T131, the driving unit 130(*n*+4) may be activated, and the scan signal S(n+4) may be changed to the low voltage level in the time interval T132 subsequent to the time interval 131 to activate a corresponding row.

In other words, by controlling the clock signals SCLKA and JCLKA by the signal source 110, the rows of the active area 120 controlled by the scan signals S(n) to S(n+3) may be "jumped" without being scanned in the jump scan mode, and the whole scan operation may be sped up.

FIG. 12 to FIG. 14 merely provide an example. By adjusting the connection among a plurality of driving units, the number of driving unit(s) being "jumped" may be adjusted.

For example, if the jump terminal Jump of the driving unit 130(n) is coupled to the set terminal Set1 of the driving unit 130(n+5) instead of that of the driving unit 130(n+4), one more driving unit/row can be jumped.

Figure 15:
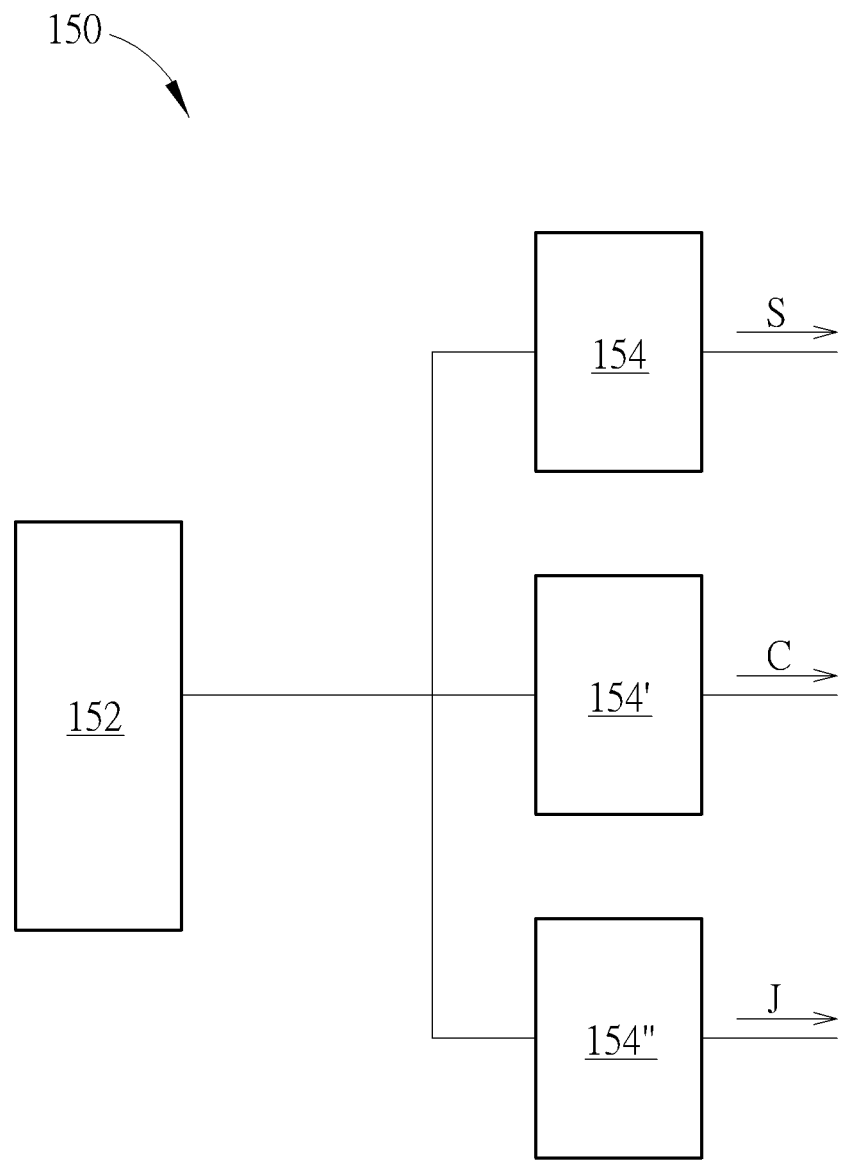
FIG. 15 illustrates a driving unit according to another embodiment.

FIG. 11 merely provides an example instead of limiting the scope of embodiments. FIG. 15 illustrates a driving unit 150 according to another embodiment. The driving unit 150 may be operated to support the normal scan mode, the skip scan mode and the jump scan mode mentioned above.

The driving unit 150 may be regarded as a first driving unit and include a latch circuit 152 and three buffer circuits 154, 154' and 154".

The latch circuit 152 may be coupled to a signal source to be controlled by the signal source 110.

The first buffer circuit 154 may be coupled to the latch circuit 152 to export the scan signal S to control a row of the active area 120. The second buffer circuit 154' may be coupled to the latch circuit 152 to export a carry signal C to a second driving unit. When operating the sensing device in a skip scan mode, the row can be skipped by adjusting the scan signal S, and clock signals from the signal source may be adjusted to speed up the whole scan operation.

The third buffer circuit 154" may be coupled to the latch circuit 152 to export a jump signal J to a third driving unit. The jump signal J in this embodiment may be similar to the jump signal J mentioned in FIG. 11 to FIG. 12 and be used in the jump scan mode.

In summary, sensing devices provided by embodiments of the disclosure may speed up the scan operation.

In addition to sensing devices such as fingerprint scanners, sensing devices provide by embodiments may be applied to other devices with scan drivers and array matrix structures such as X-ray flat panel detectors (FPDs) to skip/jump unnecessary rows and speed up the scan operation. The active area 120 may be integrated with a display such as LCD (liquid crystal display), an OLED (organic light-emitting diode) display, a QLED (quantum dot light-emitting diode) display, an LED (light-emitting diode) display with micro-LEDs and/or mini-LEDs, a flexible display, etc.

Hence, sensing devices disclosed by embodiments can support a plurality of applications and reduce problems in the field.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A sensing device, comprising:
   a signal source;
   an active area having a plurality of sensing units; and
   a plurality of driving units sequentially disposed adjacent to the active area and coupled to the plurality of sensing units and the signal source, wherein each of the plurality of driving units comprises a latch circuit and a plurality of buffer circuits coupled to the latch circuit, and in a first one of the plurality of driving unit, a first buffer circuit is configured to export a first scan signal to control a first row of the active area, and a second buffer circuit is configured to export a carry signal to a second one of the plurality of driving unit;
   wherein the signal source provides a first operating mode and a second operating mode; in the first operating mode, a scan signal exported from one of the plurality of driving units has a first voltage level and a second voltage level; and in the second operating mode, the scan signal has the second voltage level.

2. The sensing device of claim 1, wherein a transistor of the active area is turned on when the scan signal is at the first voltage level, and the transistor of the active area is turned off when the scan signal is at the second voltage level.

3. The sensing device of claim 1, wherein in the first operating mode, the first scan signal has the first voltage level to activate the first row of the active area to perform scanning, and the carry signal has the first voltage level to activate the second driving unit.

4. The sensing device of claim 1, wherein in the second operating mode, the first scan signal has the second voltage level to inactivate the first row of the active area to perform scanning, and the carry signal has the first voltage level to activate the second driving unit.

5. The sensing device of claim 1, wherein the first driving unit comprises a third buffer circuit, and the third buffer circuit is configured to export a second scan signal corresponding to a second row of the active area.

6. The sensing device of claim 5, wherein in the second operating mode, the second scan signal has the second voltage level to inactivate the second row of the active area to perform scanning, and the carry signal has the first voltage level to activate the second driving unit.

7. The sensing device of claim 1, wherein the latch circuit comprises:
   a first terminal configured to receive a reset signal;
   a second terminal configured to receive a set signal;
   a third terminal configured to export a first output signal; and
   a fourth terminal configured to export a second output signal;
   wherein the first output signal and the second output signal are complementary to each other.

8. The sensing device of claim 7, wherein the latch circuit comprises:
   a first transistor comprising a first end configured to receive the reset signal, a second end configured to output the first output signal, and a control end coupled to the first end of the first transistor;
   a second transistor comprising a first end coupled to the first end of the first transistor, a second end coupled to the second end of the first transistor, and a control end;
   a third transistor comprising a first end configured to receive the set signal, a second end coupled to the control end of the first transistor and configured to output the second output signal, and a control end coupled to the second end of the first transistor; and
   a fourth transistor comprising a first end coupled to the first end of the third transistor, a control end coupled to the first end of the third transistor, and a second end coupled to the second end of the third transistor.

9. The sensing device of claim 1, wherein the latch circuit comprises:
   a first terminal configured to receive a reset signal;
   a second terminal configured to receive a first set signal;
   a third terminal configured to receive a second set signal;
   a fourth terminal configured to export a first output signal; and a fifth terminal configured to export a second output signal;

wherein the first output signal and the second output signal are complementary to each other.

10. The sensing device of claim 9, wherein the latch circuit comprises:
   a first transistor comprising a first end configured to receive the reset signal, a second end configured to export the first output signal, and a control end coupled to the first end of the first transistor;
   a second transistor comprising a first end coupled to the first end of the first transistor, a second end coupled to the second end of the first transistor, and a control end;
   a third transistor comprising a first end, a second end coupled to the control end of the second transistor, and a control end coupled to the first end of the second transistor;
   a fourth transistor comprising a first end configured to receive the first set signal, a second end coupled to the control end of the second transistor, and a control end coupled to the first end of the fourth transistor; and
   a fifth transistor comprising a first end configured to receive the second set signal, a second end coupled to the control end of the second transistor, and a control end coupled to the first end of the fifth transistor.

11. The sensing device of claim 1, wherein each of the plurality of buffer circuits comprises a first terminal configured to receive a first output signal from the latch circuit, a second terminal configured to receive a second output signal from the latch circuit, and a third terminal configured to export a third output signal.

12. The sensing device of claim 11, wherein the first output signal and the second output signal are complementary to each other, and the third output signal is transmitted to a corresponding row of the active area or another one of the plurality of driving units.

13. The sensing device of claim 11, wherein each of the plurality of buffer circuits comprises:
   a first transistor comprising a first end, a second end configured to export the third output signal, and a control end configured to receive the first output signal from the latch circuit;
   a second transistor comprising a first end coupled to the second end of the first transistor, a second end configured to receive a clock signal, and a control end;
   a capacitor coupled between the second end of the first transistor and a control end of the second transistor; and
   a third transistor comprising a first end configured to receive the second output signal from the latch circuit, a control end, and a second end coupled to the control end of the second transistor.

14. The sensing device of claim 1, wherein the active area further comprises a plurality of transistors, and each of the driving units comprises a plurality of transistors of a same type of the transistors of the active area.

15. A sensing device, comprising:
a signal source;
an active area having a plurality of sensing units; and
a plurality of driving units sequentially disposed adjacent to the active area and coupled to the plurality of sensing units and the signal source, wherein each of the plurality of driving units comprises a latch circuit and a plurality of buffer circuits coupled to the latch circuit, an ith driving unit of the plurality of driving units comprises a first buffer circuit and a second buffer circuit, the first buffer circuit is configured to export a scan signal to a row of the active area and an (i+1)th driving unit of the plurality of driving units, and the second buffer circuit is configured to export a jump signal to a jth driving unit of the plurality of driving units, i and j are positive integers, and i+1<j;
wherein the signal source provides a first operating mode and a second operating mode; in the first operating mode, a scan signal exported from one of the plurality of driving units has a first voltage level and a second voltage level; and in the second operating mode, the scan signal has the second voltage level.

16. The sensing device of claim 15, wherein in the first operating mode, the scan signal has the first voltage level to activate a corresponding row of the active area to perform scanning, and the jump signal has the second voltage level.

17. The sensing device of claim 15, wherein in the second operating mode, the scan signal is at the second voltage level to inactivate a corresponding row of the active area to perform scanning, and the jump signal has the first voltage level.

18. A sensing device, comprising:
a signal source;
an active area having a plurality of sensing units; and
a plurality of driving units sequentially disposed adjacent to the active area and coupled to the plurality of sensing units and the signal source;
wherein the signal source provides a first operating mode and a second operating mode; in the first operating mode, a scan signal exported from one of the plurality of driving units has a first voltage level and a second voltage level; and in the second operating mode, the scan signal has the second voltage level; and
wherein a first one of the plurality of driving units comprises:
a latch circuit coupled to the signal source and being controlled by the signal source;
a first buffer circuit coupled to the latch circuit to export the scan signal to control a row of the active area;
a second buffer circuit coupled to the latch circuit to export a carry signal to control a second one of the plurality of driving units; and
a third buffer circuit coupled to the latch circuit to export a jump signal to a third one of the plurality of driving units.

\* \* \* \* \*